UNITED STATES PATENT OFFICE.

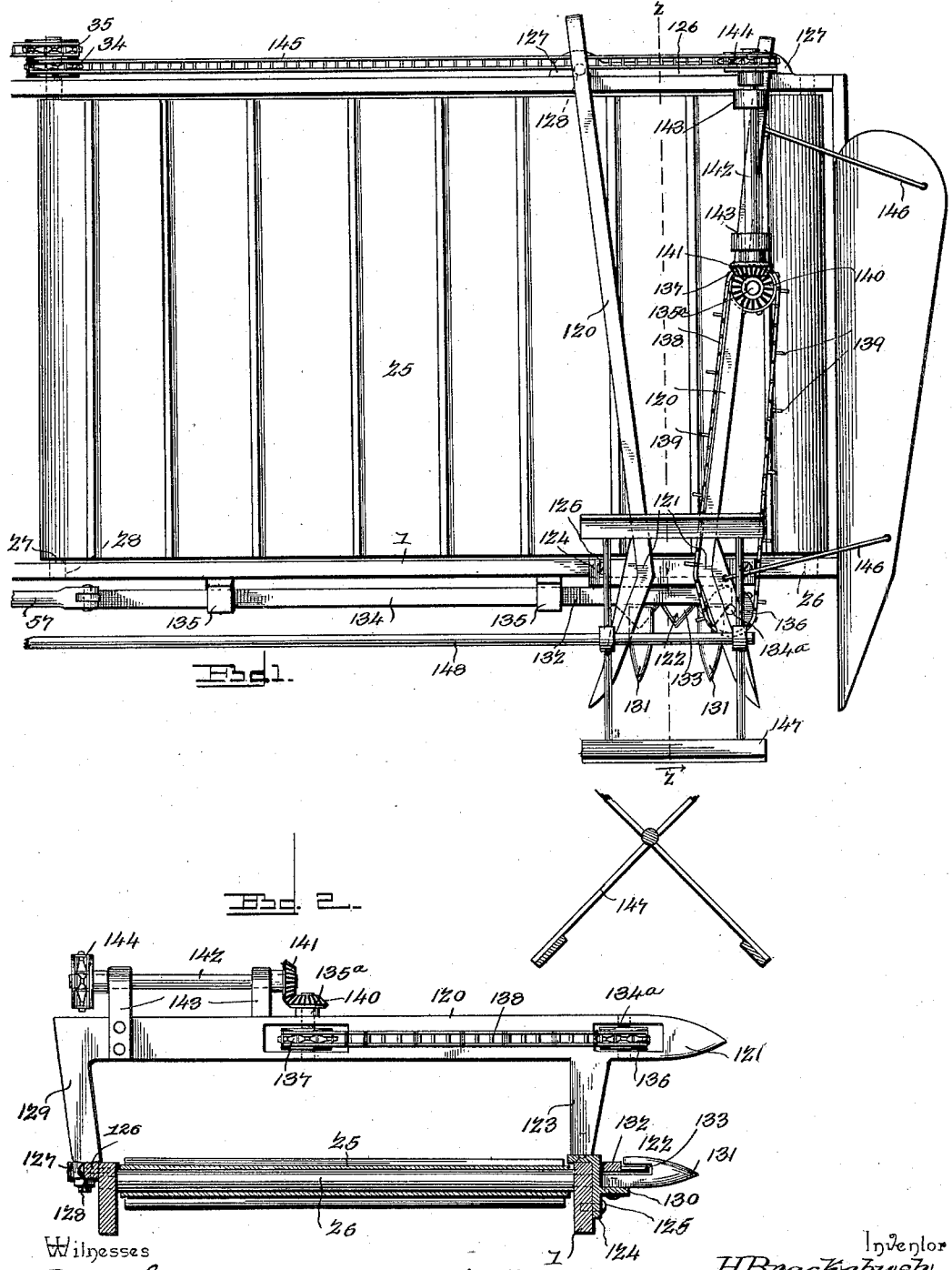

HENRY BRACKEBUSH, OF PACKWAUKEE, WISCONSIN.

HARVESTING-MACHINE.

SPECIFICATION forming part of Letters Patent No. 656,690, dated August 28, 1900.

Application filed March 20, 1900. Serial No. 9,427. (No model.)

*To all whom it may concern:*

Be it known that I, HENRY BRACKEBUSH, a citizen of the United States, residing at Packwaukee, in the county of Marquette and State of Wisconsin, have invented a new and useful Harvesting-Machine, of which the following is a specification.

My invention is an improved harvesting-machine, the object of my invention being to provide an improved corn-harvesting attachment which is adapted to operate in connection with a harvesting and binding machine to adapt the same for also harvesting corn.

My invention consists in the peculiar construction and combination of devices hereinafter fully set forth, and pointed out in the claim.

In the accompanying drawings, Figure 1 is a top plan view of a portion of a harvesting-machine provided with my improved attachment for harvesting corn. Fig. 2 is a sectional view of the same, taken on the line 2 2 of Fig. 1.

In the construction of my improved corn-harvesting attachment for grain-harvesting machines a pair of rearward-diverging side frames 120 have their front ends, which are appropriately spaced apart, provided with forward diverging guide-arms 121, which engage the cornstalks from opposite sides of the row and cause the same to be presented to the action of the cutting mechanism 122. Said frames 120 are provided near their front ends with vertical supporting-arms 123, the lower ends of which are bolted to an angle-plate 124, which serves to connect them together and is adapted to be placed and supported on the front side of the frame 1 and bolted thereto, as at 125, thereby securing the front ends of frames 120 on said frame 1. A plate 126 is adapted to be bolted to the rear side of frame 1 and is provided with supporting flanges or ears 127, having vertical openings which receive both studs 128, that extend downward from supporting-arms 129 at the rear ends of the frames 120, and hence the rear ends of said frames are adapted to be secured to and readily detached from the frame 1. The plate 124 is provided on its front side with a horizontal flange 130, to which are bolted a series (two or more) of finger-bars 131, on which reciprocate a cutter-bar 132, provided with cutter-teeth 133. Said finger-bars, cutter-bar, and cutter-teeth are substantially like corresponding parts of the cutting mechanism usually employed on harvesters for wheat and the like grains, but are larger and more substantially built than such corresponding parts on said harvesting-machines and are especially adapted for cutting the stalks of corn. The cutter-bar 132 is provided at one end with an extended arm 134, which is supported in bracket-guides 135 and is of appropriate length, and when my improved corn-harvesting attachment is secured on the frame of the harvester, as shown and hereinbefore described, the cutting mechanism of the harvester having been removed the said arm 134 of said cutter-bar 132 is connected to the pitman 57, as shown in Fig. 1, and thereby the cutting apparatus of the corn-harvester is operated.

In the frame 120 which is nearest the grain end of the frame 1 are mounted a pair of vertical shafts 134ª 135ª, provided, respectively, with sprocket-wheels 136 137, which are connected together by an endless feed-chain 138, one lead of which travels rearward on the inner side of the frame, and said endless chain is provided with projecting spurs 139, which are adapted to engage the cornstalks as the same are cut by the cutting mechanism and feed the same in the act of falling rearward, so that the cornstalks fall transversely across the platform apron or conveyer 25. Said platform conveyer is carried by the rollers 26 27, the latter being at the inner end thereof, and the shaft 28 of said roller having at its rear end sprocket-wheels 34 35, the latter being engaged by an endless sprocket-chain, as shown, driven from a suitable counter-shaft on the harvesting-machine, which is not here shown, as the same is no part of my present improvements. It will be observed by reference to Fig. 2 that the frames 120 are supported at such a height above the platform conveyer that they clear the corn delivered onto the platform conveyer and afford no obstruction thereto and that as the corn falls upon the platform conveyer the latter sweeps it from under the frames 120 and carries it to the elevator conveyer or apron, from whence the corn is delivered onto the grain-deck and the binding mechanism.

On the upper end of the shaft 135ª is a miter-gear 140, which engages a similar gear 141 on a shaft 142, which is journaled in bearing-standards 143, which are bolted on the frame 120 nearest the grain end of frame 1. Said shaft 142 has at its rear end a sprocket-wheel 144, which is driven by an endless sprocket-chain 145 from the sprocket-wheel 34 on shaft 27, and hence the feed-chain 138 is actuated by the mechanism which operates the conveyer-apron.

The frame 120 which is nearest the grain end of frame 1 is connected thereto by suitable bolt-rods 146, which serve to brace said frame and contribute to the stability of the fastenings of the corn-harvesting attachment.

When the corn-harvesting attachment is in use, a small reel 147 is used, said reel 147 being disposed directly in advance of the corn-harvesting attachment and having an extended shaft 148, which is supported and rotated by the usual means employed to support and rotate the reel-shaft in a machine of this class, said reel-shaft supporting and operating means being no part of my present improvements.

Having thus described my invention, I claim—

A corn-harvesting attachment for harvesting-machines of the class designed for harvesting wheat and the like grain, said corn-harvesting attachment comprising a pair of rearward-diverging frames having forward-diverging guide-arms at their proximate front ends, a plate connecting the front portion of said frames and adapted to be secured on the front side of the platform-frame of the harvester, a cutting mechanism carried by said plate, said cutting mechanism being adapted to be connected to and actuated by the pitman of the harvester, a plate connecting the rear portion of the harvester-attachment frames, said plate being adapted to be secured to the rear side of the harvester-platform frame, an endless traveling feed-chain and operating mechanism therefor, carried by one of the frames of said corn-harvesting attachment and an operating-shaft for said endless traveling feed-chain, said shaft being mounted on said frame and adapted to be connected to and receive power from a shaft of the harvester, substantially as described.

In testimony that I claim the foregoing as my own I have hereto affixed my signature in the presence of two witnesses.

HENRY BRACKEBUSH.

Witnesses:
JAMES DUFF,
F. J. DODGE.